United States Patent [19]

Morisawa

[11] 4,337,568

[45] Jul. 6, 1982

[54] PROCESS FOR FABRICATING CUP-SHAPED CORELESS ARMATURE

[75] Inventor: Masanori Morisawa, Kadoma, Japan

[73] Assignee: Matsushita Electric Industrial Co., Ltd., Osaka, Japan

[21] Appl. No.: 142,120

[22] Filed: Apr. 21, 1980

[30] Foreign Application Priority Data

Apr. 24, 1979 [JP] Japan ............................... 54-051172

[51] Int. Cl.³ .......................................... H02K 15/02
[52] U.S. Cl. ................. 29/598; 264/272.21; 310/43; 310/266
[58] Field of Search ................. 29/598, 596, 597; 310/43, 266; 264/272

[56] References Cited

U.S. PATENT DOCUMENTS 3,212,170 10/1965 Marshall ............................... 29/598
4,263,711 4/1981 Sakano et al. ...................... 29/598 X Primary Examiner—Carl E. Hall
Attorney, Agent, or Firm—Joseph W. Farley

[57] ABSTRACT

A process for fabricating a cup-shaped coreless armature by placing a cup-shaped armature winding and a component including a commutator for constituting the armature into a heating die assembly along with a molding resin member in the form of a solid at room temperature, clamping the die assembly to melt the resin member and thereafter curing the resin to unite the winding and the commutator into a rigid body with the resin.

9 Claims, 11 Drawing Figures

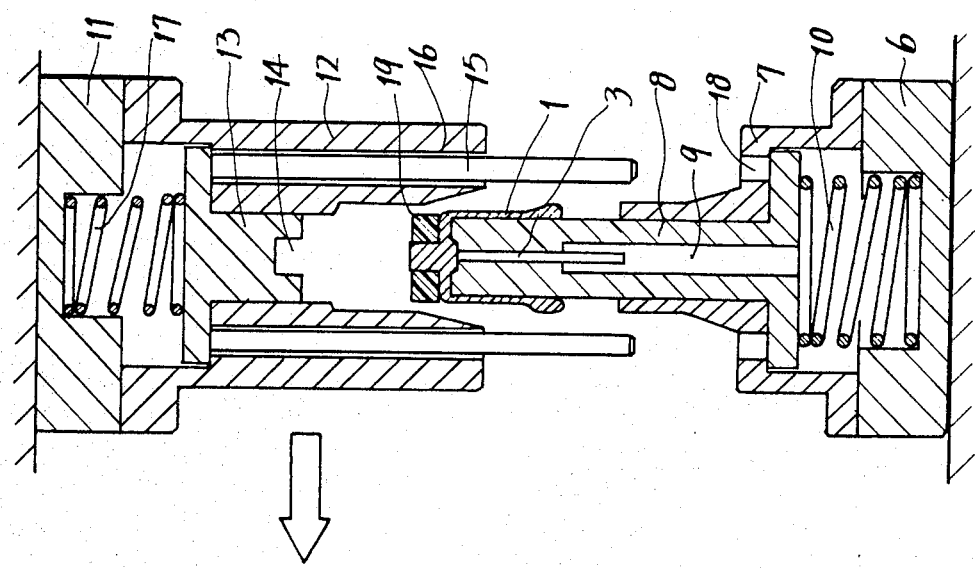
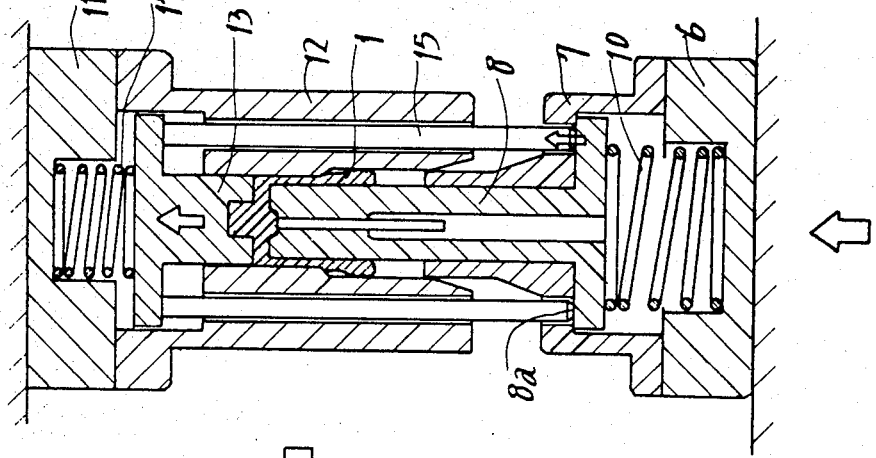
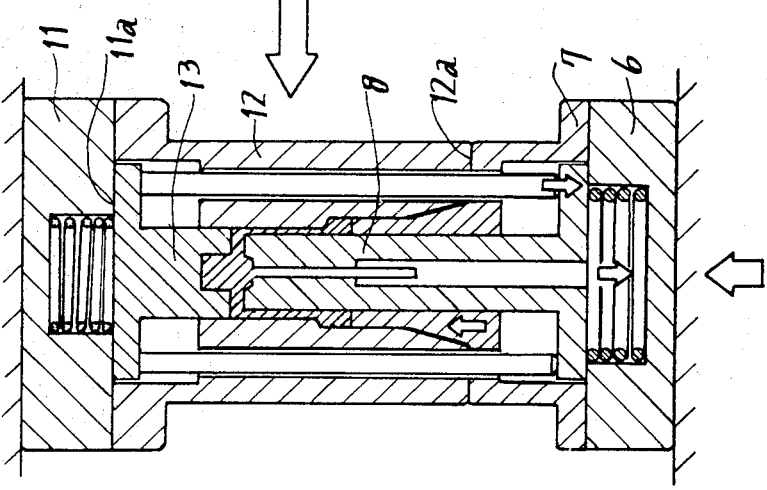

PROCESS FOR FABRICATING CUP-SHAPED CORELESS ARMATURE

The present invention relates to a process for fabricating a cup-shaped coreless armature by winding conductors a specified number of turns in the form of a cup to obtain an armature winding, placing the armature winding and a component including a commutator for constituting an armature into a die along with a molding resin member, causing the resin member to flow into the space defined by the die and curing the resin to rigidly join the armature winding and the armature component together.

Cup-shaped coreless armatures are fabricated usually by the following process. First, conductors are wound by a winding device into a cup-shaped armature winding, and the winding is shaped as specified within a shaping die. The lead ends of sections of the winding are then connected to the risers of a commutator attached to a shaft to prepare an armature assembly, which is thereafter placed into a molding die. A solution of resin such as epoxy resin is poured into the die under reduced pressure, and the die is heated to cure the resin to obtain a coreless armature.

This process nevertheless is not adapted for mass production because the process requires a heating furnace, the solution is of very low viscosity, needs much time (at least one hour) for curing with heat and therefore necessitates a large number of dies, and the process further requires much time for the pouring of the resin and removal of flashes. Additionally the process involves a problem in the quality of the product since the reduced pressure at which the resin is poured into the die permits formation of voids in the resin molding, giving reduced strength to the armature.

To improve the conventional process, it has been proposed to place a cup-shaped armature assembly into a die and injecting heated semi-cured resin into the die under pressure through a gate at the opening of the cup or a peripheral portion of its bottom. Although this process is much more amenable to mass production than the foregoing process since the resin can be injected into a group of many dies from a pot and is curable in several minutes, the pressure applied for injecting the resin is liable to deform the armature winding or lead end portions of conductors connected to the commutator when the conductors of the winding have a small diameter, or to cause intimate contact of conductors with the likelihood of short-circuiting. Moreover, the resin will remain in the runner, pot or the like, with the result that only about 20 to 30% of the resin is effectively used for molding.

A first object of the invention is to provide a process for fabricating armatures in which armature components are placed into a die along with a resin member for the effective use of the resin without any waste to reduce the resin cost for the manufacture of the armatures.

A second object of the invention is to make it possible to heat and fluidize resin and shape an armature winding within the same die to simplify the manufacturing equipment for a cost reduction, greatly shorten the manufacturing process and reduce the time needed for the manufacture of armatures.

A third object of the invention is to make it possible to apply resin to an armature winding at a pressure slightly higher than the atmospheric pressure while reducing the friction between the conductors of the winding with the resin wetting the winding and to fix the winding with the resin within a short period of time to prevent short-circuiting, break or deformation of the winding.

A fourth object of the invention is to provide a process in which the armature winding needs to be heated only once so as to reduce the thermal degradation of the winding.

These and other objects and advantages of the invention will become apparent from the following description of embodiments with reference to the accompanying drawings in which:

FIGS. 3 to 5 are sectional views illustrating steps of fabricating a cup-shaped coreless armature according to a first embodiment of the invention;

Figure 1:
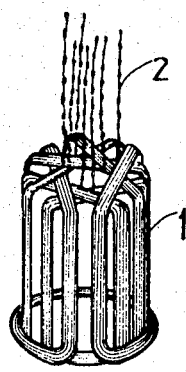
FIG. 1 is a perspective view showing an armature winding according to the invention.

For the fabrication of a cup-shaped coreless armature of this invention, electric wires which are thermally self-adhesive are wound a specified number of turns into coils by a winding device, and a predetermined number of coils are combined to prepare an armature winding 1 shown in FIG. 1.

Figure 2:
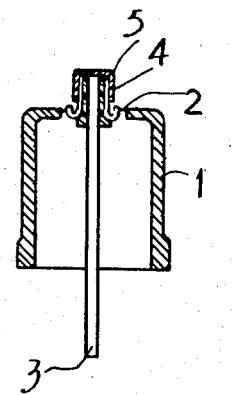
FIG. 2 is a sectional view showing an armature according to the invention before it is molded with resin.

The lead ends 2 of the winding 1 are then connected to a commutator 4 attached to a shaft 3 as seen in FIG. 2. A protective cover 5 is fitted over the commutator 4 so that resin will not adhere to the undercut and outer peripheral portions of the commutator 4 during the resin molding to be described later.

The armature assembly is then placed into the die assembly shown in FIG. 3 for resin molding. The mold assembly comprises a lower die support 6 having a heater (not shown) incorporated therein, a lower die main body 7 attached to the lower die support 6, a movable lower die member 8 having a shaft inserting bore 9 in its center, a lower coil spring 10 for biasing the movable lower die member 8 outward from the lower die main body 7 at all times, an upper die support 11 having a heater (not shown) incorporated therein, an upper die main body 12 attached to the upper die support 11 for shaping the outer periphery of the armature winding to a specified form, a movable upper die member 13 loosely fitting in the upper die main body and having a commutator inserting cavity 14 in its center, and dimensioning rods 15 attached to the movable upper die member 13 and extending through bores 16 formed in the upper die main body 12. An upper coil spring 17 for biasing the movable upper die member 13 toward the movable lower die member at all times has a smaller force than the lower coil spring 10. The lower die main body 7 is formed with bores 18 extending therethrough and opposed to the dimensioning rods 15. Indicated at 19 is an annular resin plate serving as the molding material for the armature winding 1 and composed of a kneaded mixture of A-stage (uncured) thermosetting epoxy resin, additives and specified pigment.

Figure 6:
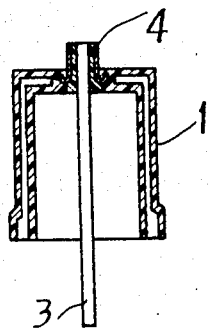
FIG. 6 is a sectional view showing an armature fabricated by the steps shown in FIGS. 3 to 5.

The resin molding operation to be performed by the die assembly of FIG. 3 will be described with reference to FIGS. 4 and 5. The heaters incorporated in the lower die support 6 and upper die support 11 are energized to heat the die assembly in its entirety and maintain the assembly at a predetermined temperature. Next, the armature assembly shown in FIG. 2 is placed on the top end of the movable lower die member 8, with the resin plate 19 placed on the armature assembly. The lower die block comprising the support 6, main body 7 and movable member 8 is raised to start to clamp the die assembly. During die clamping, the first striking contact between the lower end upper die blocks takes place between a flange 8a on the movable lower die member 8 and the dimensioning rods 15 as seen in FIG. 4. Since the upper coil spring 17 is weaker than the lower coil spring 10, the movable upper die member 13 thereafter starts to rise in the direction of an arrow and continues to rise until it comes into contact with the upper die support 11. During this movement, the armature winding 1 is progressively shaped to the desired form. After the movable upper die member 13 has come to a halt at its upper limit position 11a, the movable lower die member 8 is restrained from rising by the dimensioning rods 15, and the lower coil spring 10 starts compression. With the compression of the lower coil spring 10, the lower die main body 7 enters the upper die main body 12 to shape the open end of the cup-shaped winding 1. Finally the lower die main body 7 comes into contact with the lower end 12a of the upper die main body 12 as seen in FIG. 5, whereby the die assembly is completely clamped. On the other hand, the resin plate 19 progressively melts during the shaping of the armature winding 1, wetting the winding 1 and reducing the friction between the wound conductors as well as between the winding and the die, and fills the space defined by the die assembly. After the die assembly has been completely clamped as seen in FIG. 5, the assembly is held in this state for several minutes, whereby the resin is cured to unite the winding 1, shaft 3 and commutator 4 into a rigid body. The die assembly is thereafter opened in the order reverse to the above, and the completed armature as shown in FIG. 6 is withdrawn.

With the process described above, the armature winding 1, shaft 3 and commutator 4 can be united into a rigid body with resin, with the winding shaped to the specified form, simply by placing the assembly of these elements and resin plate 19 into a heating die assembly of two divided blocks of upper and lower dies and moving the lower die block upward and thereafter downward. Since the coil ends at the bottom of the cup-shaped winding 1 are held by the resin plate 19 approximately simultaneously with the start of shaping of the outer periphery of the winding 1, the lead ends 2 of the conductors connected to the commutator 4 will not be broken. While abnormal pressure appears likely to act on the coil ends depending on the magnitude of the force of the upper coil spring 17, the winding will not be compressed to dimensions smaller than a predetermined value by virtue of the provision of the dimensioning rods 15, so that the coil ends on the bottom of the cup-shaped winding will not be subjected to a great force even when the spring 17 is strong. This serves to eliminate shorting, or a break of leads 2. The resin plate 9 which comprises a kneaded mixture of thermosetting resin, additives and a predetermined pigment enables fabrication of armatures with windings of different specifications by a continuous operation when different pigments are used for identifying different specifications.

Although the resin plate 19 is placed on the bottom of the cup-shaped armature winding 1 set on the movable lower die member 8 with the above embodiment, the same armature as above can be fabricated in the same manner when the resin plate 19 is interposed between the movable die member 8 and the bottom. The A-stage thermosetting resin used in the foregoing embodiment is replaceable by a B-stage (semi-cured) resin to shorten the curing time. Further to reduce the curing time, the resin plate 19 may be preheated before molding. Although the lower die block is raised toward the upper die block in a fixed position for die clamping according to the above embodiment, the upper die block may be pressed down from above against the lower die block in a fixed position. When desired, the shaft 3 may be fixedly inserted into an armature assembly after the resin has been cured.

Figure 7:
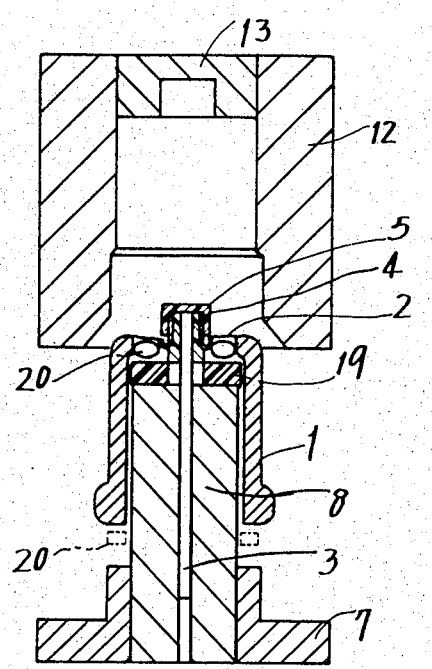
FIG. 7 is a sectional view showing a cup-shaped coreless armature while it is being fabricated according to a second embodiment of the invention.
Figure 8:
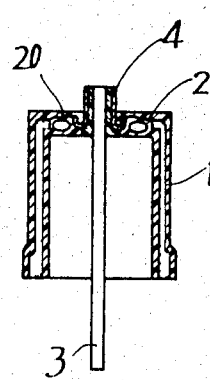
FIGS. 8 and 9 are sectional views showing armatures fabricated according to the second embodiment of the invention.

FIG. 7 shows a second embodiment of the invention by which armatures can be fabricated in the same manner as by the foregoing embodiment except that a cushioning member 20, such as hollow ring of small wall thickness, which is reducible in volume when subjected to pressure is placed on the bottom of the cup-shaped armature winding 1, especially at the location of the leads 2 of the conductors connected to the commutator. FIG. 8 shows an armature thus fabricated.

According to the second embodiment using the cushioning member 20 which is reducible in volume when subjected to pressure, the same die assembly and resin plates of the same type are usable for windings of different specifications even when the resin plates 19 vary in the amount of resin. The resin can be filled at a uniform level without exceeding a definite level. The member 20 also affords protection of the winding 1.

Figure 9:
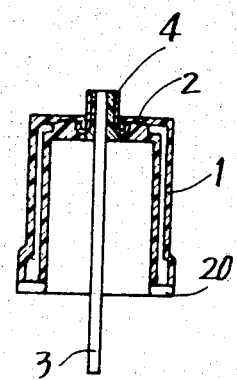

The same effects as above are achievable when the cushioning member 20 is disposed at the open end of the cup-shaped winding 1 as indicated in a broken line in FIG. 7. FIG. 9 shows a cup-shaped coreless armature fabricated by this process.

Figure 10:
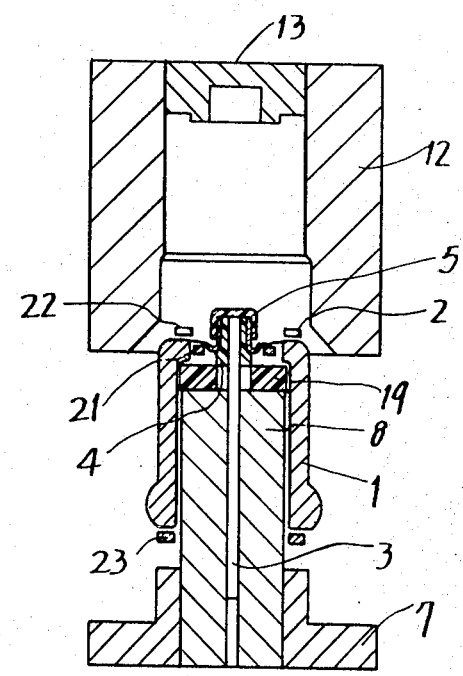
FIG. 10 is a sectional view showing a cup-shaped coreless armature while it is being fabricated according to a third embodiment of the invention.
Figure 11:
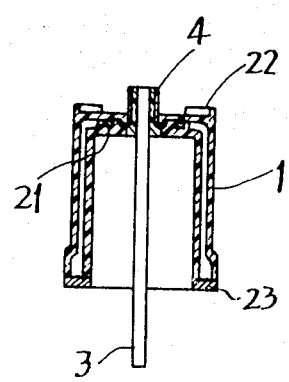
FIG. 11 is a sectional view showing an armature fabricated according to the third embodiment of the invention.

FIG. 10 shows a third embodiment of the invention in which the resin plate 19 is placed on the movable lower die member 8, and the armature winding 1 is placed thereon along with a commutator 4 connected to the leads 2 and provided with a resistance element 21 for protecting the commutator, shaft 3 and the highly magnetic member 22 to be installed on the winding 1, with a balance weight 23 disposed at the opening of the cup-shaped winding 1. These components are united in the same manner as in the first embodiment into an armature as shown in FIG. 11.

Armatures can be fabricated by the above process without necessitating injection of resin from outside even when incorporating additional components, such as resistance element 21, magnetic member 22, balance weight, etc. Since these components are united simultaneously with the winding shaping process, such components can be held elastically by the elasticity of the winding without entailing cracking or like objection.

What is claimed is:

1. A process for molding and shaping a cup-shaped coreless armature comprising the steps of winding conductors a specified number of turns in the form of a cup to obtain an armature winding, placing the armature winding and an armature component including a commutator into a heating die assembly along with a molding resin member in the form of a solid at room temperature, the heating die assembly including relatively movable outer and inner die members formed to define the outer, inner and end dimensions of the armature, relatively moving the die members while melting the resin member to progressively shape the armature winding and cause the molten resin to flow into the space defined by the die assembly, and thereafter curing the resin to rigidly unite the armature winding and the armature component including the commutator with the resin.

2. A process as defined in claim 1 wherein the heating die assembly comprises a movable inner die member for placing the armature winding thereon and defining the inner peripheral dimension of the armature, an inner die main body for restraining the movable inner die member from lateral movement and shaping the open end of the cup-shaped armature, a movable outer die member opposed to the movable inner die member for determining the dimensions of the bottom of the cup-shaped armature, and an outer die main body for restraining the movable outer die member from lateral movable and for determining the outer peripheral dimensions of the armature, the movable inner die member and the movable outer die member being biased toward each other by springs of different forces respectively, so that when the movable inner die member and the inner die main body, or the movable outer die member and the outer die main body are moved toward the opposed die member for clamping the die assembly, the bottom of the cup-shaped armature is dimensionally defined by the movable inner and outer die members, and the inner die main body and the outer die main body are thereafter brought into intimate contact with each other to shape the armature winding as specified while causing the resin to flow into the space within the die assembly to rigidly unite the armature winding and the commutator in a predetermined shape.

3. A process as defined in claim 2 wherein the spring for biasing the movable outer die member has a smaller spring force than the spring for biasing the movable inner die member, and the bottom of the cup-shaped armature is dimensionally defined by dimensioning rods attached to the movable outer or inner die member for determining the distance between the die members when one of the die members is moved relative to the other.

4. A process as defined in claim 1 wherein the molding resin member is a resin ring having a pigment incorporated therein.

5. A process as defined in claim 1 wherein a cushioning member reducible in volume when subjected to pressure is disposed within the heating die assembly together with the armature winding, the commutator and the molding resin member.

6. A process as defined in claim 5 wherein the cushioning member is disposed at the location of the leads of the armature winding connected to the commutator.

7. A process as defined in claim 5 wherein the cushioning member is positioned at the open end of the cup-shaped armature winding.

8. A process as defined in claim 1 wherein additional components including a protective element for the commutator and a highly magnetic member are placed into the die assembly together with the armature winding and the molding resin member, in proximity to the coil ends of the winding, and the additional components are embedded in the armature when the resin member is melted and cured.

9. A process as defined in claim 1 wherein the step of relatively moving the die members is carried on by first relatively moving the die members to form the inner and bottom portions of the cup-shaped armature, and by then relatively moving the die members to form the outer and open and portions of the armature.

* * * * *

UNITED STATES PATENT AND TRADEMARK OFFICE
CERTIFICATE OF CORRECTION

PATENT NO. : 4,337,568
DATED : July 6, 1982
INVENTOR(S) : MASANORI MORISAWA

It is certified that error appears in the above—identified patent and that said Letters Patent is hereby corrected as shown below:

Column 4, line 1, "9" should read -- 19 --.

Column 4, line 41, "of" should read -- to --.

Column 6, line 39, "and" (second occurrence) should read -- end --.

Signed and Sealed this

Nineteenth Day of October 1982

[SEAL]

Attest:

Attesting Officer

GERALD J. MOSSINGHOFF

Commissioner of Patents and Trademarks